United States Patent
Pfob

(10) Patent No.: US 7,500,811 B2
(45) Date of Patent: Mar. 10, 2009

(54) THREAD CUTTING TAP RETAINER

(75) Inventor: Franz Pfob, Probstried (DE)

(73) Assignee: Zettl GmbH, Betzigau (DE)

( * ) Notice: Subject to any disclaimer, the term of this patent is extended or adjusted under 35 U.S.C. 154(b) by 348 days.

(21) Appl. No.: 11/358,488

(22) Filed: Feb. 21, 2006

(65) Prior Publication Data

US 2006/0186614 A1 Aug. 24, 2006

(30) Foreign Application Priority Data

Feb. 18, 2005 (DE) .................... 10 2005 007 708

(51) Int. Cl.
*B23B 51/06* (2006.01)

(52) U.S. Cl. .................... 408/56; 408/138; 408/141; 279/16; 279/20; 279/82; 279/156; 279/905

(58) Field of Classification Search ............. 408/56–58, 408/138, 141; 409/135, 136, 72; 279/20, 279/76, 82, 156, 905, 16

See application file for complete search history.

(56) References Cited

U.S. PATENT DOCUMENTS

| 3,751,051 | A | * | 8/1973 | Schmidt | 279/16 |
| 3,967,830 | A | * | 7/1976 | Smith | 279/16 |
| 4,284,374 | A | * | 8/1981 | Senzaki | 408/139 |
| 4,531,865 | A | * | 7/1985 | Johnson | 408/139 |
| 4,547,105 | A | * | 10/1985 | Hofle et al. | 408/141 |
| 4,692,073 | A | * | 9/1987 | Martindell | 408/239 A |
| 4,752,088 | A | | 6/1988 | Stahl et al. | |
| 4,810,138 | A | | 3/1989 | Obara | |
| 4,878,679 | A | * | 11/1989 | Plank et al. | 279/19.4 |
| 5,271,697 | A | * | 12/1993 | Johnson et al. | 408/222 |
| 5,464,229 | A | * | 11/1995 | Salpaka | 279/30 |
| 5,674,031 | A | * | 10/1997 | Bilz et al. | 408/6 |
| 6,126,370 | A | * | 10/2000 | Wheeler et al. | 408/239 R |
| 6,135,679 | A | * | 10/2000 | Kazda | 408/57 |
| 6,199,872 | B1 | * | 3/2001 | Hasan | 279/30 |
| 6,224,303 | B1 | * | 5/2001 | Wheeler et al. | 408/239 R |
| 6,364,318 | B1 | * | 4/2002 | Bedi et al. | 279/22 |
| 6,457,916 | B2 | * | 10/2002 | Wienhold | 408/240 |
| 6,634,651 | B2 | * | 10/2003 | Tralli | 279/16 |
| 6,929,266 | B2 | * | 8/2005 | Peters et al. | 279/82 |

FOREIGN PATENT DOCUMENTS

| DE | 38 52 309 | 6/1995 |
| DE | 3852309 | 6/1995 |
| DE | 44 23 433 | 11/1995 |
| DE | 197 25 950 | 12/1998 |
| DE | 197 42 269 | 7/1999 |
| DE | 10147581 | 3/2003 |
| EP | 0360947 | 4/1990 |
| EP | 360 947 | 11/1994 |

* cited by examiner

*Primary Examiner*—David P Bryant
*Assistant Examiner*—Eric A. Gates
(74) *Attorney, Agent, or Firm*—Notaro & Michalos P.C.

(57) ABSTRACT

A collet chuck for retaining a thread cutting tool with a sleeve is axially movable in the interior and has a mechanism for retaining the thread cutting tool. To shorten the tool changing times it is provided that the mechanism for retaining the tool is an axially movable quick-change sleeve guided in the collet chuck or in the sleeve, which quick-change sleeve is developed such that it is stayed via a spring, axially with respect to the sleeve and a clamping body for clamping a tool is provided.

9 Claims, 2 Drawing Sheets

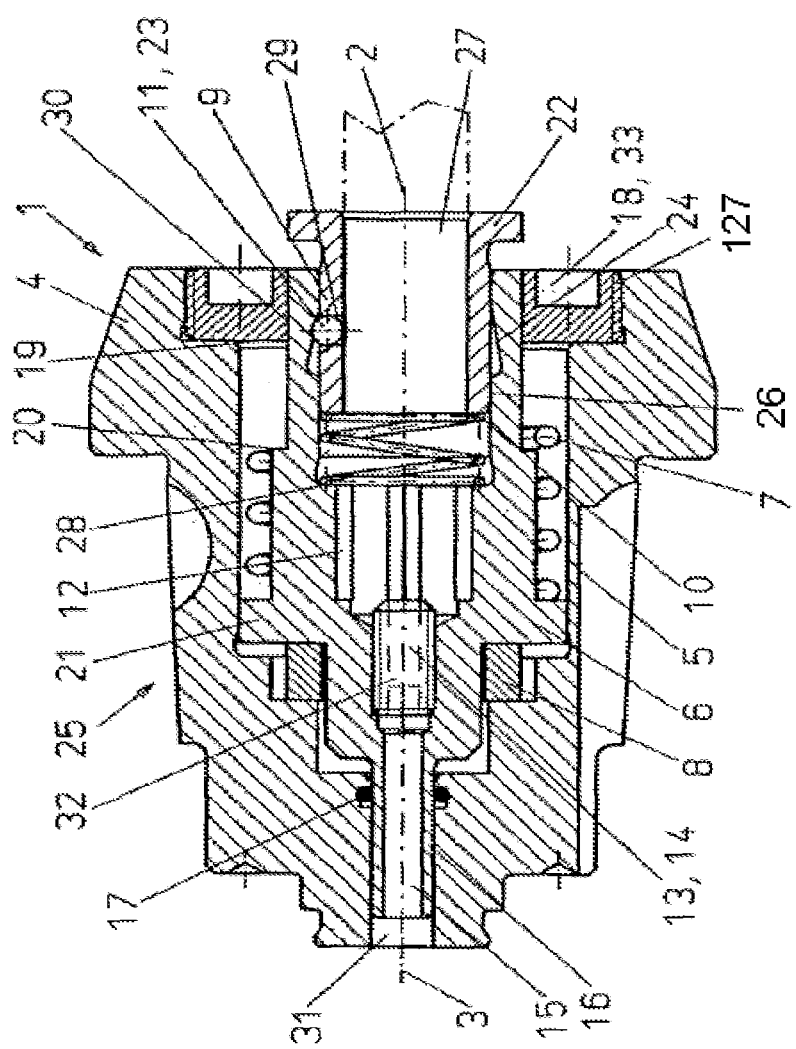
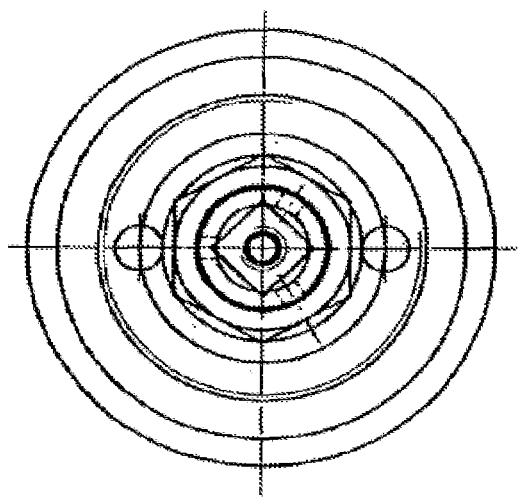

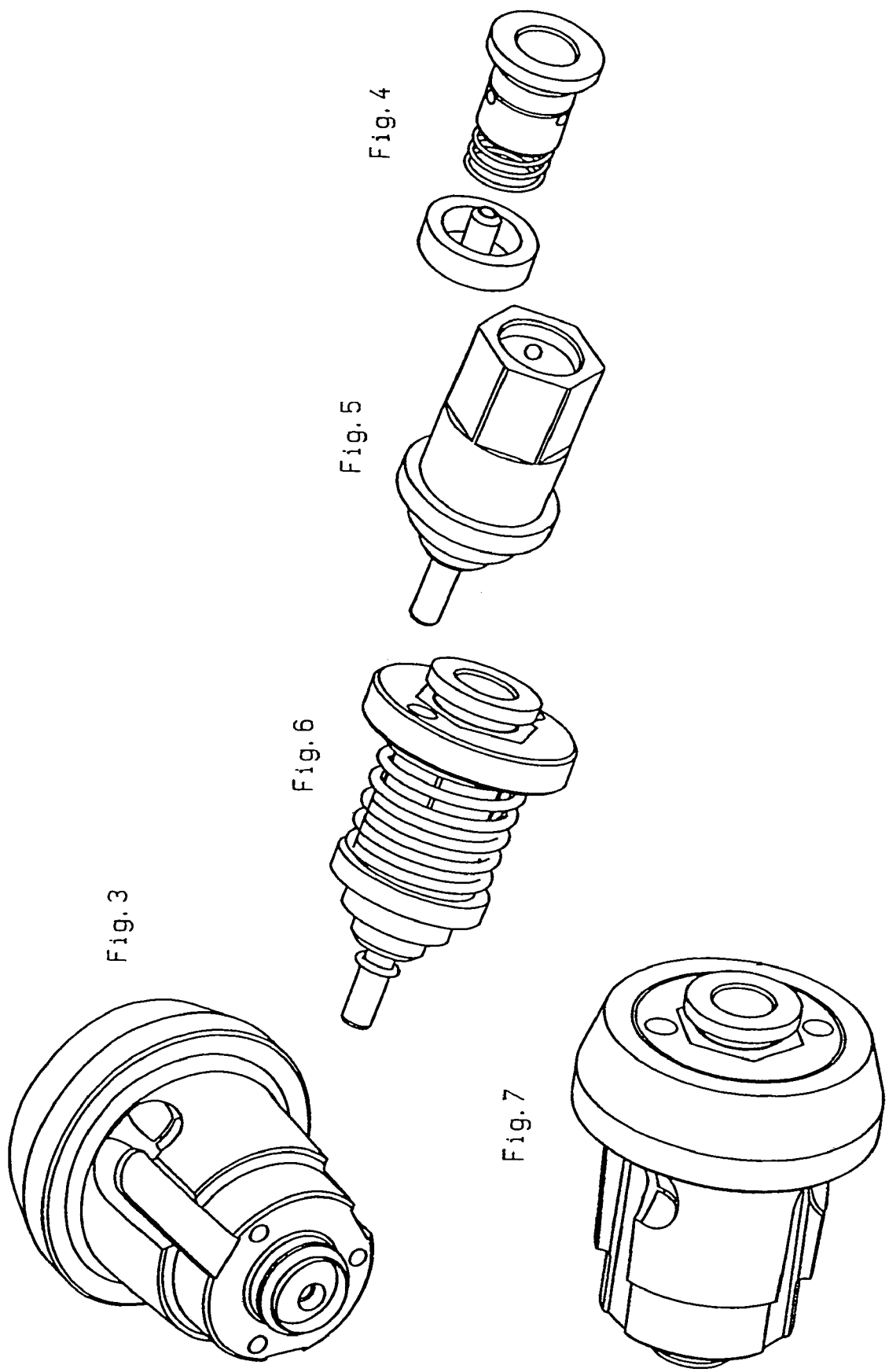

THREAD CUTTING TAP RETAINER

The invention relates to a collet chuck for retaining a cutting tool, in particular a thread cutting tool which, on the one hand, is subjected to a rotational movement about its axis and, on the other hand, to an axial movement, wherein the collet chuck is intended to be carried by a chuck holder, which is mounted on the axis of a machine tool, wherein said collet chuck has an outer body with a bore, whose outer shape corresponds to the receiving form of the chuck holder, and a sleeve kinematically rotationally connected through means with the outer body, and wherein said sleeve is axially movable in the interior of the bore and comprises means to retain the cutting tool, and means are provided, which limit the axial movement of the sleeve in the interior of the bore, as well as elastically deformable reset means to a predetermined normal position for the sleeve are provided.

In particular thread cutting taps, which carry out a rotational movement as well as also an axial movement, can easily be damaged through mechanical constraint. The movements of the driving machine tool must therefore agree as exactly as possible with the kinematics predetermined by the shape of the threaded taps. Due to friction and play this cannot always be ensured. With the reversal of the rotational direction or with changes of the friction as well as through the effect of moments of inertia of the spindle, constraint can be exerted onto the threaded tap. Similar problems can also occur in honing tools.

To solve this problem, for example specific thread cutting tap machines are known which are capable of absorbing the axial movement differences between tap and machine. Of disadvantage in these machines is that they can only be applied for the particular working purpose and, in addition, are highly voluminous.

In current working centers it is desirable to be able to utilize as completely as possible the given working space. Voluminous tools restrict the working space and therewith also the maximum size of the workpieces to be worked.

This problem is solved through a collet chuck according to the species for retaining a cutting tool, such as is described in DE 38 52 309 T2. In the known implementation the cutting tool is retained by means of radial machine screws. The disadvantage of the difficulty entailed therein of the reproducibility of the axial position of the tool is solved through the self-compensating axial movement capability of the chuck. The longer the compensation path of the chuck, the simpler is the adjustment operation. In addition to its clamping function, the chuck permits compensation, acting in the axial direction, of movement differences at the same installation volume as that of the standard tools, which serve only for clamping the tool. The chuck is mounted in the interior of the standard chuck holder, without any adaptation being required and without increasing the space requirement in comparison to exchangeable inserts.

In this known implementation radial machine screws must be tightened to clamp the tool shaft when changing the tool, which under unfavorable conditions can also affect the radial position of the tool. Shortening of the tool changing times is also desirable in the case of threaded taps.

To transfer the torque from the outer body onto the sleeve, prior art provides that said bore of the outer body has at least a polygonal nut facing, which cooperates with at least a polygonal insertion facing of the sleeve in order to connect the outer body and the sleeve kinematically in rotation and also to ensure the axial guidance of said sleeve in the interior of said body. In this solution the length of the polygonal facing, or the necessary guidance, must exceed the compensation path, which disadvantageously increases the installation length of the collet chuck.

The aim of the invention is to increase the productivity of the working centers by shortening the tool changing times without appreciably restricting their working space or impairing the working precision.

This aim is attained in a collet chuck according to the species thereby that the means for retaining the tool is an axially movable quick-change sleeve guided in the collet chuck or in the sleeve, which is formed stayed via a spring axially with respect to the sleeve and a clamping body for clamping a tool is provided. The entire collet chuck substantially corresponds in terms of its installation volume to the known collet chuck without disadvantageously increasing the volume. Tools, such as for example screw drivers for tightening machine screws, are not required for the clamping process. The tool changing times are consequently advantageously decreased, such that the productivity of the machine increases.

In the physical form of the invention is provided that the sleeve for entrainment of the tool has at least one, preferably polygon-like, interior entrainment facing, for example a square, to connect kinematically the tool and the sleeve in rotation. Apart from the automatic compensation of the axial movement differences of the threaded tap and of the spindle advance, with this chuck it is possible to change the tool within an extremely short time without major adjustment operations. The cooperating entrainment facing ensures that the necessary torque is transmitted over the facing rotationally symmetrically from the sleeve to the tool, such that no forces are generated transversely to the tool axis, which might negatively affect the radial position of the tool.

It is advantageously arranged that on the sleeve is provided, counteracting the reset means, an elastic material which is disposed such that it stays the sleeve with respect to the outer body. Incidental vibrations are thereby damped.

Thereby that a stop for the axial staying of a tool is provided in the sleeve, a reproducible axial position of the tool can also be ensured after the tool change. As the reference face serves preferably the rearward end face of the tool. If the stop is implemented as a machine screw, the position of the stop can also be adjusted with definition and sensitively. This is important should the length of the threaded tap have changed due to a new grinding.

Due to the measure that the outer body and the sleeve have at least one, preferably axially disposed, channel for the supply of a cooling lubricant, a centrally lubricated threaded tap can also be used. The supply of the cooling lubricant in this case takes place according to the invention through the axial bore without disadvantageously increasing the installation length.

In spite of the axial compensation capabilities, the cooling lubricant can be supplied under pressure without major leakage losses occurring thereby that the sleeve has an insertion end, located in the channel of the outer body, with a seal being disposed between insertion end and channel.

The installation length of the collet chuck becomes advantageously short, if said bore of the outer body is closed by means of a plate (33), which has at least one polygonal nut facing, which cooperates with at least one polygonal insertion facing of the sleeve, in order to connect kinematically in rotation the outer body and the sleeve and also to ensure the axial guidance of said sleeve in the interior of said body.

Mounting the plate is facilitated if the plate is implemented as a threaded ring. After the mounting, the ring is preferably secured by adhesion against an unintentional twisting when inserting it.

If the spring is disposed on the threaded ring such that it is stayed, which is provided as a stop for a shoulder of a diameter step of the sleeve, the collet chuck can also be dismounted in simple manner. After loosening the threaded ring all interiorly located parts can be readily removed from the collet chuck.

The first cut of the threaded tap is improved if the sleeve has a collar whose one side is disposed such that it forms a support surface of the spring and whose other side forms a support surface of the elastic material. Thereby the advancing force during the first cut is built up slowly and mechanical vibrations are damped.

Due to the measure that the outer body has a bore to receive the sleeve, whose different diameters are formed such that they taper from the outside inwardly, most working processes in the production of the collet chuck can be carried out from one side, such that through this structure the collet chuck can be produced more favorably.

In terms of construction, the clamping body for quick-clamping of the tool can be demonstrated especially favorably in such form that the quick-clamping sleeve has at least one radial bore, in which a ball is provided, which as a clamping body is disposed such that it is stayed on a conical inner peripheral surface, wherein a spring is provided moving the quick-clamping sleeve in the direction of the tapering conical inner peripheral surface.

The invention will be explained in conjunction with a drawing which depicts a preferred embodiment example.

The Figures of the drawing show:

FIG. 1 an axial section through a collet chuck according to the invention,

FIG. 2 a view of the tool side,

FIG. 3 a three-dimensional view of the collet chuck from the side facing away from the tool, FIG. 4 a three-dimensional view of the structural components of quick-change sleeve with spring, elastic material and stop, FIG. 5 a three-dimensional view of the sleeve, FIG. 6 a three-dimensional view of the assembly of sleeve, reset means, threaded ring and quick-change sleeve, and FIG. 7 a three-dimensional view of the collet chuck from the side facing toward the tool In FIGS. 1 and 2 the collet chuck according to the invention is denoted by the reference number 1. The outer form 25 corresponds to that of a conventional chuck, which is intended to be carried by a known chuck holder of a machine spindle. It can be implemented, for example, as a conventional Morse cone or inter alia as shown in FIG. 3.

The collet chuck is substantially comprised of three parts, placed telescope-like one within the other, which are substantially rotationally symmetric. The outer body 4 has an outer form 25, which is adapted to the receiver of the driving machine. In addition, the outer body 4 has an axial bore 5, which serves for receiving an inner sleeve 6 making possible the axial compensation of the movement. The sleeve is shown three-dimensionally in FIG. 5 and as an assembly in FIG. 6. The sleeve 6, in turn, has a bore 26, into which a section with a conical peripheral surface 24 is worked. Further sections of the bore 26 guide a quick-change sleeve 9, whose bore 27, lastly, serves for receiving a not shown tool shaft whose axis is denoted by 2.

The sleeve 6, which makes the compensation possible, bears a collar 21 on its outer side which is stayed on the one side via an elastic material 8 on a shelf of the bore 5, such that the advancing force of a driving spindle can be transmitted via the outer body 4 and the elastic material 8 onto the collar 21 of the sleeve 6.

The collar 21 is stayed on the other side via a spring 7 on a threaded ring 18, which is screwed into an inner thread section 127 of bore 5.

The spring 7 permits that the sleeve 6, guided in the threaded ring 18 and in the bore 5, can move axially out of the outer body 4 against the reset force of spring 7, until a shoulder 20 of the sleeve 6 is moved against the stop 19 of threaded ring 18. The distance of the shoulder 20 and stop 19 determines the axial compensation path.

The quick-change sleeve 9 is guided in bore 26 of sleeve 6. FIG. 4 shows the assembly of quick-change sleeve with spring in perspective view. A compression spring 10 acting in the axial direction, which is stayed on one side against a shoulder 28 of sleeve 6 and, on the other side, presses against the end face of the quick-change sleeve 9, exerts a reset force onto the sleeve 9 in the direction of the tapering cone-form surface 24. Thereby the ball 23, provided in a radial bore 29, which is stayed on the conical surface 24, is pressed in the direction of the tool axis 2. The ball 23 serves as a clamping body 11, which clamps the shaft, not shown in this figure, of a tool disposed on the tool axis 2. Several, preferably three, such balls are distributed over the circumference.

The transmission of the torque of a machine tool spindle takes place over the outer form 25, for example a Morse cone, onto the outer body 4. From this it is transmitted via a polygonal facing pairing 30, in this case a hexagonal peripheral facing, from the outer body 4 via the adhered threaded ring 18 to the sleeve 6 and from it, in turn, via the polygonal peripheral facing 12, in this case a square, onto a correspondingly formed counter-facing of the not shown tool.

The axial position of the tool can be adjusted through the machine screw 14 which serves as stop 13. The machine screw 14 is disposed within the tool axis 2, such that when inserting the tool, the end face of the inserted tool shaft can abut the machine screw 14.

The machine screw 14 can be adjusted by means of a suitable tool, for example an hexagonal socket wrench, through an axially disposed cooling lubricant bore 15. For the supply of a cooling lubricant through the machine axle 3 the sleeve 6 has an insertion end 16 with a cooling lubricant bore, which is inserted into a corresponding channel 31 of the outer body 4. The gap between outer body 4 and insertion end 16 of the sleeve 6 is closed by a seal 17. The cooling lubricant can consequently be guided onto the machine axle 3 through the channel 31 and the cooling lubricant bore 15 as well as through a channel 32, provided in the machine screw 14, up to the front-side end of a centrally lubricated, not shown, tool.

A tool located in the collet chuck is released by pressing the collar 22 in the direction of the sleeve 6. With the axial movement of the quick-change sleeve 9 in the direction of sleeve 6, the ball 23 moves radially outwardly on the conical peripheral surface 24 and can thus release the tool. On the circumference of the sleeve 9 are preferably symmetrically distributed several such balls 23. After removing the tool, the clamping shaft of a new tool can be inserted until its end face abuts the machine screw 14. By rotating the hollow machine screw 14 the axial position of the tool can be preset. The collet chuck with the tool is subsequently inserted into the spindle of the machine tool.

As discussed, the FIGS. 3 and 7 show the collet chuck from different directions in a three-dimensional illustration and FIGS. 4, 5 and 6 assemblies or components of the collet chuck.

In this way a collet chuck with axial compensation path for threaded taps is provided, in which the threaded tap can be changed especially rapidly.

LIST OF REFERENCE NUMBERS

1. Collet chuck
2. Tool axis
3. Machine axle
4. Outer body
5. Bore
6. Sleeve
7. Reset means
8. Elastic material
9. Quick-change sleeve
10. Spring
11. Clamping body
12. Peripheral facing, entrainment square
13. Stop
14. Machine screw
15. Channel
16. Insertion end
17. Seal
18. Threaded ring with hexagonal socket
19. Stop
20. Shoulder
21. Collar
22. Collar
23. Ball
24. Conical inner peripheral surface
25. Form
26. Bore
27. Inner threads
28. Shoulder
29. Radial bore
30. Polygonal facing pairing
31. Channel
32. Channel
33. Plate

The invention claimed is:

1. Collet chuck for retaining a cutting tool, which is subjected to a rotational movement about its axis and an axial movement, wherein the collet chuck is intended to be carried by a chuck holder, which is mounted on the axis of a machine tool, and wherein said collet chuck comprises:

an outer body with a bore, whose outer form corresponds to the receiving form of the chuck holder; and a sleeve, which is kinematically rotationally connected with the outer body and wherein said sleeve is axially movable in the interior of the bore and comprises:

an axially movable quick-change sleeve (9) to retain the cutting tool;

means for limiting the axial movement of the sleeve in the interior of the bore; and an elastically deformable reset means (7) for biasing the sleeve toward a normal position for the sleeve;

wherein said axially movable quick-change sleeve (9) is guided in the collet chuck or in the sleeve, and wherein said quick-change sleeve is implemented such that it is stayed via a spring (10) axially with respect to the sleeve (6) and a clamping body (11, 23);

wherein said bore of the outer body is closed by means of a plate (33) which has at least a polygonal nut facing and which cooperates with at least one polygonal insertion facing of the sleeve, in order to connect the outer body and the sleeve kinematically in rotation and also ensure the axial guidance of said sleeve in the interior of said body.

2. Collet chuck as claimed in claim 1, wherein the plate (33) is formed as a threaded ring (18).

3. Collet chuck as claimed in claim 1, wherein, on the sleeve (6) and counteracting biasing of the reset means (7), an elastic material (8) is provided, which is disposed for staying the sleeve with respect to the outer body (4).

4. Collet chuck as claimed in claim 1, wherein the sleeve (6) has an insertion end (16) which is disposed in a channel (15) of the outer body (4), and wherein between the insertion end (16) and the channel (15) a seal (17) is disposed.

5. Collet chuck as claimed in claim 1, wherein said reset means comprises a spring (7) which is disposed such that it is stayed on a threaded ring (18), which comprises a stop (19) for a shoulder (20) of a diameter step of the sleeve (6).

6. Collet chuck for retaining a cutting tool, which is subjected to a rotational movement about its axis and an axial movement, wherein the collet chuck is intended to be carried by a chuck holder, which is mounted on the axis of a machine tool, and wherein said collet chuck comprises:

an outer body with a bore, whose outer form corresponds to the receiving form of the chuck holder; and a sleeve, which is kinematically rotationally connected with the outer body and wherein said sleeve is axially movable in the interior of the bore and comprises:

an axially movable quick-change sleeve (9) to retain the cutting tool; and means for limiting the axial movement of the sleeve in the interior of the bore; and an elastically deformable reset means (7) for biasing the sleeve toward a normal position for the sleeve;

wherein said axially movable quick-change sleeve (9) is guided in the collet chuck or in the sleeve, and wherein said quick-change sleeve is implemented such that it is stayed via a spring (10) axially with respect to the sleeve (6) and a clamping body (11,23);

said reset means comprising a spring (7) which is disposed such that it is stayed on a threaded ring (18), which is intended as a stop (19) for a shoulder (20) of a diameter step of the sleeve (6).

7. Collet chuck as claimed in claim 6, wherein, on the sleeve (6) and counteracting biasing of the reset means (7), an elastic material (8) is provided, which is disposed for staying the sleeve with respect to the outer body (4).

8. Collet chuck as claimed in claim 6, wherein the sleeve (6) has an insertion end (16) which is disposed in a channel (15) of the outer body (4), and wherein between the insertion end (16) and the channel (15) a seal (17) is disposed.

9. Collet chuck as claimed in claim 6, wherein, on the sleeve (6) and counteracting biasing of the reset means (7), an elastic material (8) is provided, which is disposed for staying the sleeve with respect to the outer body (4), the sleeve (6) having a collar (21) whose one side is disposed to form a staying face of the spring (7) and whose other side forms a staying face of the elastic material (8).

* * * * *